Aug. 6, 1968    M. F. A. JULIEN    3,395,769
VEHICLE SUSPENSION DEVICES
Filed Jan. 24, 1966
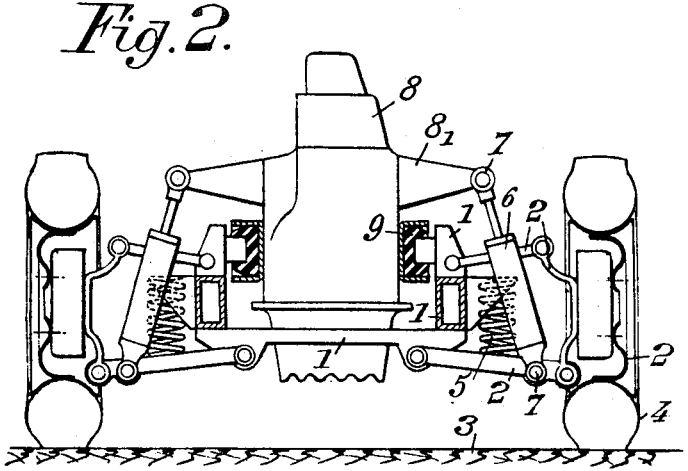
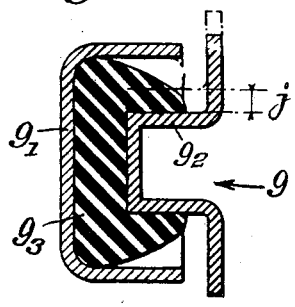
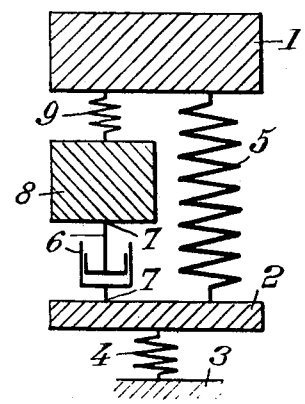
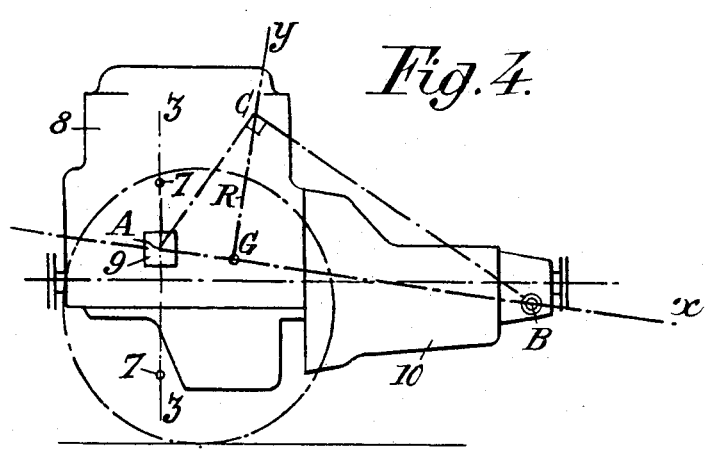

United States Patent Office 3,395,769
Patented Aug. 6, 1968

3,395,769
VEHICLE SUSPENSION DEVICES
Maurice Francois Alexandre Julien, Paris, France, assignor to Paulstra, Levallois-Perret, France, a society of France
Filed Jan. 24, 1966, Ser. No. 522,453
Claims priority, application France, Feb. 2, 1965, 4,151
5 Claims. (Cl. 180—64)

ABSTRACT OF THE DISCLOSURE

A suspension device interposed between the main frame and the half-suspended structure of a vehicle. A spring and a hydraulic shock absorber are placed in parallel with each other between said frame and said structure, the shock absorber being connected between the said structure and a heavy mass such as an engine, a transmission, or the like, and the heavy mass in turn being connected to the main frame through a resilient support.

The present invention relates to suspension devices for vehicles running on pneumatic tires and more especially to suspension devices interposed between the "suspended" rigid frame of this vehicle and the wheels thereof, which may be considered as "half suspended" through the pneumatic tires.

The chief object of the present invention is to provide a suspension device of this type which is better adapted to meet the requirements of practice than those known up to this time.

The suspension devices according to this invention comprise a spring, in particular a compression spring, and a shock absorber, in particular of the hydraulic telescopic type, both mounted in parallel between the frame of the vehicle and a half suspended part thereof, such as a wheel axle journal. It is characterized in that the shock absorber is connected to the vehicle frame through the intermediate of a heavy mass, such as the vehicle engine or a portion at least of its power transmission means, said heavy mass being itself suspended to the vehicle frame, preferably through gradual abutment resilient supports.

A preferred embodiment of the present invention will be hereinafter described with reference to the appended drawings, given merely by way of example, and in which:

FIG. 1 diagrammatically shows a suspension device made according to the invention;

FIG. 2 is a front elevational view, with parts in section, showing an embodiment according to the present invention of such a suspension device;

FIG. 3 is a vertical sectional view on an enlarged scale of a detail of the structure of FIG. 2; and FIG. 4 is an elevational diagram.

It will be reminded that it is known to include in a suspension device a main spring, in particular working in compression, and a shock absorber, in particular of the hydraulic type, both mounted in parallel between the vehicle frame and the wheel or, to be more accurate, between the vehicle frame and a half suspended part carrying the wheel axle journal or pivotally mounted thereto.

The shock absorber must perform two functions.

First, in order to contribute in making the suspension comfortable, it must absorb, in parallel with the main spring, the oscillations of the amplitude (some centimeters) and of low frequency (from 0.8 to 2 Hz.) of the vehicle frame, such oscillations being produced by obstacles or undulations of great wavelength (some meters) of the road along which the vehicle is running.

Secondly, in order to ensure a good holding of the road by the vehicle, the shock absorber must contribute in absorbing, together with the pneumatic tire, the oscillations of low amplitude (some millimeters) and of higher frequency (from 6 to 12 Hz.) of the half suspended masses connected with the wheels (wheel rims, hubs, axles, axle carriers, brakes and parts of the axles and springs), which oscillations are produced by unequalities and undulations of small wavelength (some decimeters) of the road.

As a rule, the connection of the shock absorber respectively with the vehicle frame and the above mentioned half suspended part is ensured through joints having a relatively low resiliency in the direction in which the shock absorber is working.

The drawback of such an arrangement is that, in accordance with the principle of action and reaction, the shock absorbing stresses developed by the shock absorber are nearly fully transmitted to the vehicle frame, which is advantageous for absorbing the oscillations of this frame but objectionable concerning the relative high frequency oscillations of the half suspended part. As a matter of fact the transmission to the frame of the shock absorbing stresses corresponding to said last mentioned oscillations produces vibrations which are very disagreeable for the vehicle passengers.

In order to obviate this drawback, it has already been proposed to increase the resiliency of the joints for the fixation of the shock absorber, in the direction where the latter is working. This solution is advantageous concerning the comfort of the passengers but considerably reduces the efficiency of the absorption of the half suspended mass oscillations, thus reducing the qualities of the vehicle for holding the road.

According to the present invention, these drawbacks are avoided by interposing, between the shock absorber and the vehicle frame, a heavy mass (internal combustion engine, rear transmission, etc.) connected, on the one hand, to the shock absorber through a relatively stiff articulation and, on the other hand, to the vehicle frame through at least one gradual abutment resilient support.

The term "gradual abutment resilient support" is meant to designate a support capable of ensuring a resilient connection between two elements with a great flexibility for small amplitudes of the relative movements taking place between said elements and with a stiffness which increases as the value of said amplitudes becomes higher.

Said support preferably comprises a mass of rubber or another elastomer material capable of developing shearing stresses for small values of said amplitudes and compression stresses for higher values of said amplitudes.

FIG. 1 diagrammatically shows a suspension device made according to the present invention.

The suspended mass, or frame, of the vehicle is designated by reference number 1, the half suspended mass (wheel, wheel axle journal support, connecting rods pivoted to said support, etc.) by 2, the road by 3, the pneumatic tire by 4, the main spring by 5 and the shock absorber by 6.

The two elements of the shock absorber are connected, through relatively stiff hinges 7, respectively with the suspended mass 2 and with the heavy mass 8. The latter is itself suspended to frame 1 through a spring 9 of the gradual abutment type, that is to say capable of deforming vertically with a flexibility which is the lower as the amplitude of its deformation is greater.

The above described suspension device works as follows:

The low frequency oscillations undergone by mass 2 are correctly damped by shock absorber 6 which then works as a conventional "relaxation" shock absorber.

The oscillations of low amplitude and high frequency (the latter ranging from 6 to 12 Hz.) undergone by mass 2 are transmitted through hinges 7 and shock absorber 6 to the heavy mass 8. Owing to its inertia the reaction of said mass 8 to said oscillations produces oscillations which are greatly reduced (theoretically in a ratio equal to that of the respective weights of said heavy mass 8 and of half suspended mass 2). These reduced oscillations are practically fully absorbed by the small deformations of very great flexibility, of spring 9.

Concerning the shocks of greater amplitude, they produce sudden displacements of mass 8 of greatly reduced amplitude (in the ratio above indicated). If the amplitude of these sudden displacements remains below a threshold value $j$ (of the order of magnitude of 2 cm.), said displacements are practically damped by spring 9 which is not yet in abutment. If on the contrary, which happens very rarely, this amplitude exceeds threshold value $j$, said displacements are resiliently transmitted to frame 1 through spring 9.

In order to obtain the maximum flexibility of such a resilient transmission, it is advantageous to constitute the springs, or at least springs 9, by heavy masses of rubber of another elastomer material. This is what has been done in the embodiment shown by FIGS. 2 to 4 which will now be described.

In this embodiment, elements 1 to 9 above referred to play the same parts as above described.

The main springs are compression springs of the helical types. It should be noted that they might be made, at least partly, of rubber or another elastomer material, such a construction permitting, without interfering with the filtering of the high frequency of vibrations from half suspended part 2, of reducing the importance of shock absorber 6. In this case, part of the low frequency damping can then be assumed by said springs.

In the embodiment shown by the drawing, shock absorbers 6 are of the telescopic hydraulic type. Each of them is connected through articulations 7 of the type designated by the trademark term "Silent-block" (consisting essentially of rings of rubber or another elastomer material having twisting deformations) on the one hand, to one of the arms of a deformable parallellogram 2 supporting a vehicle wheel and on the other hand, to a bracket $8_1$ fixed to the engine 8 of the vehicle, said engine constituting the above mentioned "heavy mass." The engine is of the longitudinal type but might also be of the transverse type.

The supports 9 for the suspension of said engine 8 to frame 1 each include, as shown by FIG. 3:

(a) a U-shaped girder portion $9_1$ having horizontal wings rigid with the engine;
(b) a finger $9_2$ rigid with the vehicle frame and projecting into the recess formed by said portion $9_1$, the end of said finger $9_2$ being at the center of portion $9_1$ for the mean position of the support, and
(c) a mass $9_3$ of rubber or another elastomer material interposed between $9_1$ and $9_2$.

As shown by FIG. 3, rubber mass $9_3$ does not fill the whole of the volume between parts $9_1$ and $9_2$. An empty space is provided along the inner faces of the U-wings, the vertical dimension of said empty space increasing gradually toward the edge of element $9_1$.

It will be readily understood that, when elements $9_1$ and $9_2$ move vertically with respect to each other, mass $9_3$ first undergoes shearing deformations which gradually cause the volume of one of said empty spaces to decrease. Then when said empty space has ceased to exist, which corresponds to a vertical displacement $j$, mass $9_3$ works in compression, elements $9_1$ and $9_2$ being then in abutment relation with respect to each other, with the interposition of a compressed portion of mass $9_3$.

It is particularly advantageous to constitute the above mentioned heavy mass 8 by the vehicle engine, since this engine always has a relatively important weight and must always be resiliently suspended to the vehicle frame in order to avoid transmission of the engine vibrations to the frame.

However said heavy mass 8 may also be constituted by any other part or unit suspended to the vehicle frame independently of the half suspended masses 2. For instance it might consist of the rear axle unit of the vehicle.

The diagram of FIG. 4 shows the relative positions occupied, in projection on the longitudinal vertical plane of symmetry of the vehicle, by the center of gravity G of the engine plant including engine 8 and the unit 10 (constituted by the gear box and the clutch) and by point A, which is the intersection of the line $zz$ of application of the forces transmitted by the shock absorbers with the longitudinal inertia axis $Gx$ of the engine plant, at which point are advantageously located the front supports 9 of the engine.

Let point B, located on axis $Gx$, be defined by the relation $GA.GB = R^2$ (wherein R is a radius of gyration of the engine plant about its transverse inertia axis passing through B): this point G is the center of percussion conjugated with point A and, as known, the engine unit should be fixed at the rear at said point.

In order to determine the position of point B, it suffices to determine a point C on the perpendicular $Gy$ to $Gx$ such that $GC = R$, and then to trace at C the perpendicular to AC, which intersects $Gx$ at B. This construction permits of easily modifying the position of A if that of B is not suitable. As a matter of fact it suffices to rotate about C a square angle the apex of which is at C to determine a multiplicity of pairs of points A and B complying with the above mentioned condition.

The device according to the present invention has, over those existing up to this time, many advantages, in particular it permits of absorbing oscillations of all types in a flexible manner, owing to the inertia of the suspended heavy mass interposed in the connection between every shock absorber and the frame, and of transferring the forces for damping the vibrations of the engine to the rolling elements of the vehicle and not to the frame thereof.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. In a vehicle mounted on pneumatic tires, comprising a suspended main frame forming the superstructure of the vehicle and a half suspended structure including wheels for supporting said main frame, a suspension device which comprises, in combination, a spring interposed between said main frame and a part of said half suspended structure,
   a heavy mass suspended to said frame, said mass being substantially heavier than other elements of the suspension device connecting the main frame and the half-suspended structure but lighter than said main frame,
   and a shock absorber interposed between a part of said half-suspended structure and said heavy mass.

2. A suspension device according to claim 1 including gradual abutment resilient supports interposed between said heavy mass and said frame for suspension of said heavy mass to said frame.

3. A suspension device according to claim 2 wherein each resilient support comprises a mass of an elastomer material arranged to undergo shearing stresses for small amplitudes lower than a threshold value of the relative displacements between said heavy mass and said frame and to undergo compression stresses for greater amplitudes of said relative displacements.

4. For use in a motor vehicle including an engine for the propulsion thereof, a suspension device according to claim 1 wherein said heavy mass consists of said engine.

5. For use in a motor vehicle including an engine and a rear axle unit, a suspension device according to claim 1 wherein said heavy mass consists of said engine.

References Cited
UNITED STATES PATENTS

| | | | |
|---|---|---|---|
| 3,024,041 | 3/1962 | Maruhn | 280—106.5 |
| 3,209,851 | 10/1965 | Collins | 180—64 |

PHILIP GOODMAN, *Primary Examiner.*